United States Patent
Karuppannan et al.

(10) Patent No.: US 11,659,027 B1
(45) Date of Patent: May 23, 2023

(54) MULTI-NETWORK/DOMAIN SERVICE DISCOVERY IN A CONTAINER ORCHESTRATION PLATFORM

(71) Applicant: VMware, Inc., Palo Alto, CA (US)

(72) Inventors: Tamil Vanan Karuppannan, Karur (IN); Srikanth Ramakrishnan, Palakkad (IN); Riya Ganiga, Udupi (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/570,272

(22) Filed: Jan. 6, 2022

(51) Int. Cl.
| | |
|---|---|
| *G06F 15/173* | (2006.01) |
| *H04L 67/1014* | (2022.01) |
| *H04L 43/0817* | (2022.01) |
| *H04L 67/1029* | (2022.01) |
| *H04L 67/1008* | (2022.01) |

(52) U.S. Cl.
CPC ...... *H04L 67/1014* (2013.01); *H04L 43/0817* (2013.01); *H04L 67/1008* (2013.01); *H04L 67/1029* (2013.01)

(58) Field of Classification Search
CPC ............. H04L 67/1014; H04L 43/0817; H04L 67/1008; H04L 67/1029
USPC ......................................................... 709/223
See application file for complete search history.

(56) References Cited

U.S. PATENT DOCUMENTS

| | | | | |
|---|---|---|---|---|
| 10,599,499 B2 * | 3/2020 | Caldato | .................... | G06F 9/547 |
| 10,599,500 B2 * | 3/2020 | Caldato | .................... | G06F 8/60 |
| 10,708,082 B1 * | 7/2020 | Bakiaraj | ................ | H04L 45/586 |
| 10,728,145 B2 * | 7/2020 | Rao | ...................... | H04L 41/0893 |
| 10,785,122 B2 * | 9/2020 | Inamdar | ................ | H04L 67/535 |
| 10,812,374 B2 * | 10/2020 | Heron | ....................... | H04L 45/22 |
| 10,824,489 B2 * | 11/2020 | Caldato | .................. | G06F 11/203 |
| 10,838,788 B2 * | 11/2020 | Caldato | .................... | H04L 67/10 |
| 10,841,226 B2 * | 11/2020 | Mariappan | ............ | H04L 47/125 |
| 10,855,531 B2 * | 12/2020 | Vaidya | ................. | G06F 9/45558 |

(Continued)

FOREIGN PATENT DOCUMENTS

WO    WO-2022104396 A1 *  5/2022   ............ H04W 24/06

OTHER PUBLICATIONS

[No Author Listed] [online], "AKO: Avi Kubemetes Operator," github.com, retrieved on Apr. 22, 2022, retrieved from URL <https://github.com/avinetworks/avi-helm-charts/blob/master/docs/AKO/README.md>, 4 pages.

*Primary Examiner* — Alicia Baturay
(74) *Attorney, Agent, or Firm* — Barta, Jones & Foley, PLLC

(57) ABSTRACT

A computer-implemented method, medium, and system for multi-network/domain service discovery in a container orchestration platform are disclosed. In one computer-implemented method, a pool of servers with a plurality of network interface controllers (NICs) is created in a load balancer and by an operator in a worker node of a container orchestration platform, where each of the plurality of NICs is defined by a corresponding network attachment definition (NAD) object of a plurality of NAD objects. A virtual service object is generated using an annotation corresponding to the plurality of NAD objects. The virtual service object is associated to the pool of servers with the plurality of NICs. An internet protocol (IP) address of the virtual service object is transmitted to the container orchestration platform to update a status of a service object in the container orchestration platform using the IP address.

20 Claims, 10 Drawing Sheets

(56) References Cited

U.S. PATENT DOCUMENTS

| | | | |
|---|---|---|---|
| 10,868,845 B2 * | 12/2020 | Ithal | H04L 65/613 |
| 10,868,887 B2 * | 12/2020 | DeArment | H04L 67/60 |
| 10,986,150 B2 * | 4/2021 | Ithal | H04L 65/613 |
| 11,005,721 B1 * | 5/2021 | Patki | H04L 41/046 |
| 11,074,091 B1 * | 7/2021 | Nayakbomman | G06F 9/455 |
| 11,108,629 B1 * | 8/2021 | Cahyadi | G06F 9/45558 |
| 11,132,241 B2 * | 9/2021 | Caldato | G06F 9/4881 |
| 11,150,963 B2 * | 10/2021 | Nainar | G06F 9/45558 |
| 11,159,366 B1 * | 10/2021 | Gawade | H04L 41/0895 |
| 11,171,830 B2 * | 11/2021 | Vaidya | G06F 9/5077 |
| 11,178,245 B2 * | 11/2021 | Hilber | H04L 67/025 |
| 11,212,224 B1 * | 12/2021 | Austin | H04L 45/54 |
| 11,212,587 B1 * | 12/2021 | Sariel | H04N 21/4884 |
| 11,283,707 B2 * | 3/2022 | Heron | H04L 45/22 |
| 11,321,223 B2 * | 5/2022 | Gann | G06F 11/3664 |
| 11,330,076 B2 * | 5/2022 | DeArment | G06F 9/4881 |
| 11,381,617 B2 * | 7/2022 | Ithal | H04L 47/125 |
| 11,409,568 B2 * | 8/2022 | Jiang | G06F 9/5038 |
| 11,431,563 B1 * | 8/2022 | Holzman | H04L 41/22 |
| 11,451,450 B2 * | 9/2022 | Patki | H04L 43/065 |
| 11,451,549 B2 * | 9/2022 | Taft | G06F 9/45558 |
| 11,533,271 B2 * | 12/2022 | Bernat | H04L 41/5009 |
| 2020/0073692 A1 * | 3/2020 | Rao | H04L 41/0893 |
| 2020/0112487 A1 * | 4/2020 | Inamdar | H04L 67/14 |
| 2021/0303368 A1 * | 9/2021 | Yu | G06F 9/5077 |
| 2021/0392477 A1 * | 12/2021 | Taft | H04L 67/56 |
| 2022/0038501 A1 * | 2/2022 | Shen | H04L 63/20 |
| 2022/0114157 A1 * | 4/2022 | Rangasamy | G06F 9/5077 |
| 2022/0124547 A1 * | 4/2022 | Young | H04W 28/0247 |
| 2022/0147407 A1 * | 5/2022 | Asgar | G06F 11/3089 |
| 2022/0147408 A1 * | 5/2022 | Asgar | G06F 11/3476 |
| 2022/0147433 A1 * | 5/2022 | Asgar | G06F 11/0709 |
| 2022/0147434 A1 * | 5/2022 | Asgar | G06F 9/542 |
| 2022/0147542 A1 * | 5/2022 | Asgar | G06F 11/3089 |
| 2022/0210113 A1 * | 6/2022 | Pillareddy | H04L 45/745 |
| 2022/0239632 A1 * | 7/2022 | Kung | H04L 63/029 |
| 2022/0278926 A1 * | 9/2022 | Sharma | H04L 45/64 |
| 2022/0334864 A1 * | 10/2022 | K N | G06F 9/45558 |
| 2022/0358295 A1 * | 11/2022 | Nair | G06F 40/30 |
| 2022/0385581 A1 * | 12/2022 | Delos Reyes | H04L 47/125 |
| 2022/0393956 A1 * | 12/2022 | Venkata | H04L 41/5054 |

\* cited by examiner

MULTI-NETWORK/DOMAIN SERVICE DISCOVERY IN A CONTAINER ORCHESTRATION PLATFORM

TECHNICAL FIELD

The present disclosure relates to computer-implemented methods, medium, and systems for multi-network/domain service discovery in a container orchestration platform.

BACKGROUND

A container orchestration platform enables the automation of much of the operational effort required to run containerized workloads and services. This includes a wide range of things needed to manage a container's lifecycle, including, but not limited to, provisioning, deployment, scaling (up and down), networking, and load balancing. A load balancer in a container orchestration platform manages the flow of information between a server and an endpoint device (e.g., PC, laptop, tablet, or smartphone). A load balancer is a hardware or software solution that helps to move packets efficiently across multiple servers, optimizes the use of network resources and prevents network overloads. A container orchestration platform can have multiple pods, with each pod representing a group of one or more application containers, and some shared resources for those containers. A network interface controller (NIC) in a pod, also known as a network interface card, network adapter, LAN adapter or physical network interface, is a computer hardware component that connects a computer to a computer network. Some container orchestration platforms in use today expose their pods to only a single network interface, i.e., the default/primary network interface, using the default/primary NIC.

SUMMARY

The present disclosure involves computer-implemented method, medium, and system for multi-network/domain service discovery in a container orchestration platform. One example computer-implemented method includes creating a pool of servers with a plurality of network interface controllers (NICs) in a load balancer and by an operator in a worker node of a container orchestration platform, where each of the plurality of NICs is defined by a corresponding network attachment definition (NAD) object of a plurality of NAD objects. A virtual service object is generated using an annotation corresponding to the plurality of NAD objects. The virtual service object is associated to the pool of servers with the plurality of NICs. An internet protocol (IP) address of the virtual service object is transmitted to the container orchestration platform to update a status of a service object in the container orchestration platform using the IP address.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Some container orchestration platforms in use today expose their pods to only a single network interface, i.e., the default/primary network interface, and hence natively may not be effective at handling scenarios such as 5G networks, increasing remote VPN users, growing security use cases, and multi-tenant networks. The use cases associated with these scenarios may include, but not limited to, network functions virtualization (NFV) use cases in data centers, zero trust/multi-tenant architecture in VPN, and traffic inspection using firewalls and intrusion prevention systems (IPS).

Even though some container network interfaces (CNIs) in these container orchestration platforms may support additional network interfaces, these container orchestration platforms can only expose the default/primary network interface as the service endpoint for the service/ingress objects in them, because by default, endpoint object discovery in these container orchestration platforms only involves the primary network interface of the pod, by checking the status field in the pod object.

Multi-network/domain service discovery in a container orchestration platform brings benefits when compared with a container orchestration platform with a single default/primary network interface for its pods. The multi-network/domain service discovery enables a pod in the container orchestration platform to be exposed to multiple network interfaces, and hence improves the flexibility and portability in network infrastructure of the container orchestration platform, in order to meet the needs of use cases such as 5G networks, increasing remote VPN users, growing security use cases, and multi-tenant networks.

This specification describes technologies for multi-network/domain service discovery in a container orchestration platform. In some implementations, an operator of a load balancer in a container orchestration platform discovers annotations in service objects of the container orchestration platform and finds the respective network details in a pod. The operator of the load balancer in the container orchestration platform creates Virtual Service (VS) with its pools of servers pointing to the multi networks of the pod.

Figure 1:
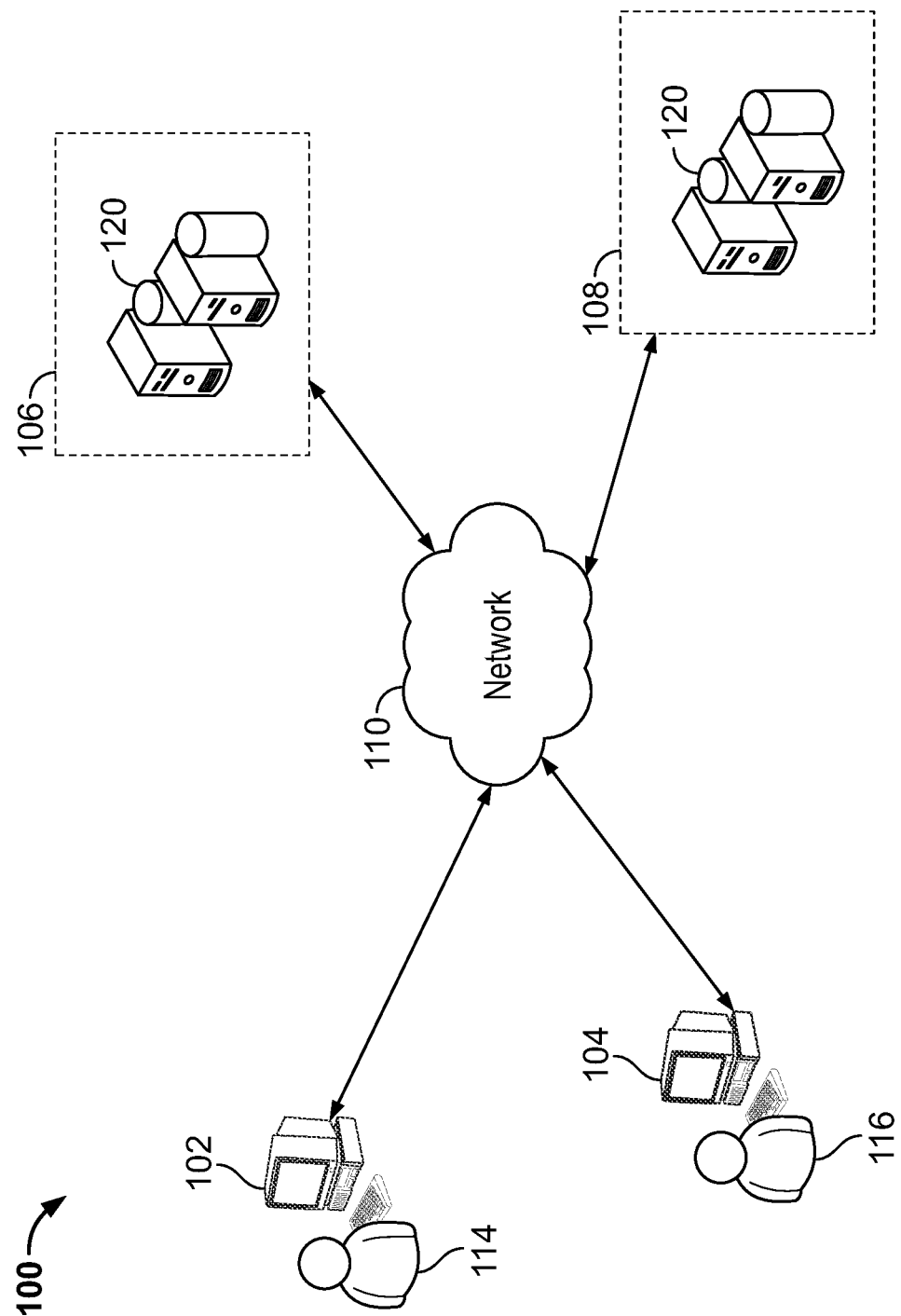
FIG. 1 depicts an example system that can execute implementations of the present disclosure.

FIG. 1 depicts an example system 100 that can execute implementations of the present disclosure. In the depicted example, the example system 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

Figure 2:
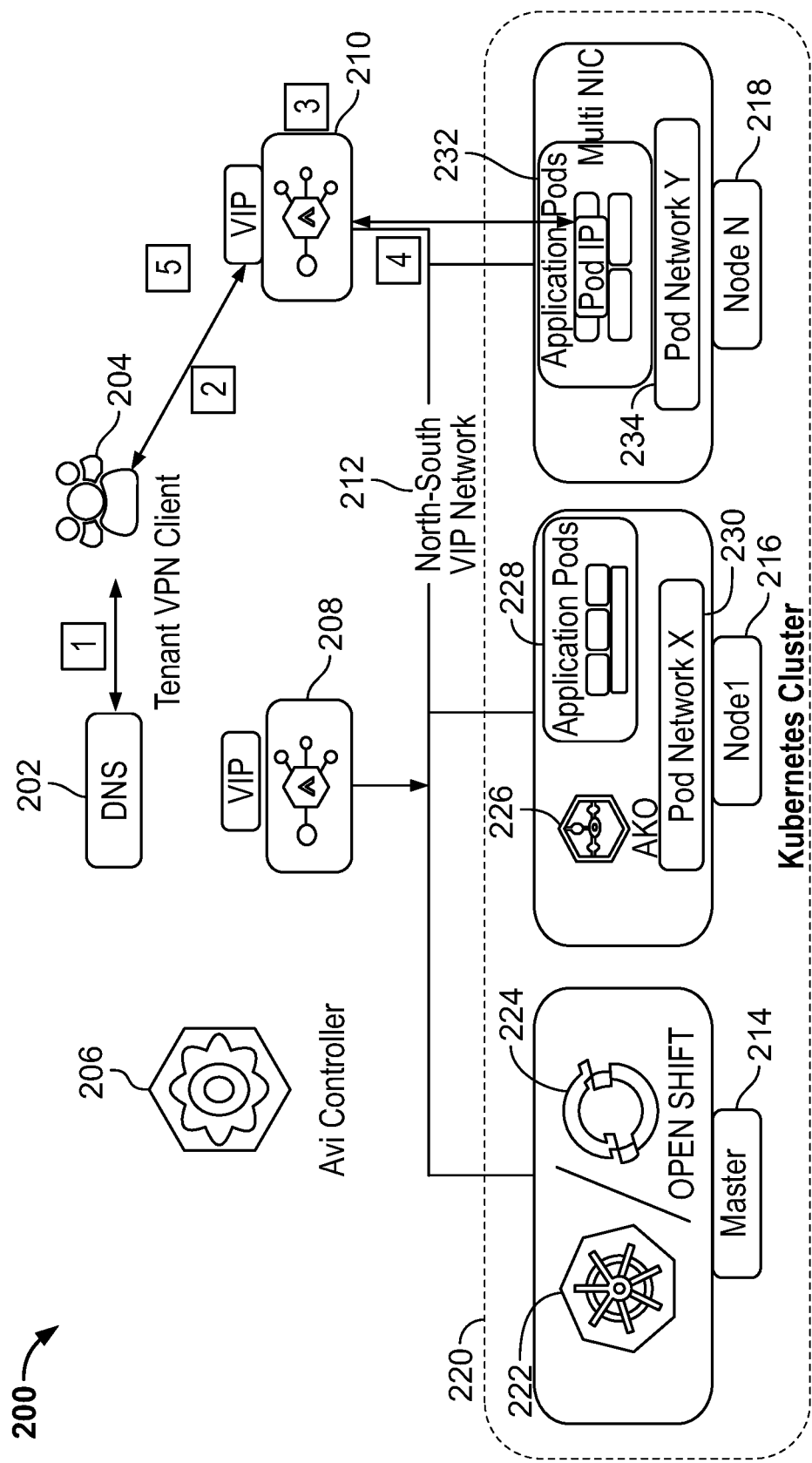
FIG. 2 illustrates an example topology for multi-network/domain service discovery in a container orchestration platform, in accordance with example implementations of this specification.

FIG. 2 illustrates an example topology 200 for multi-network/domain service discovery in a container orchestration platform 220, e.g., the Kubernetes™ Cluster, in accordance with example implementations of this specification, where an operator 226 in node 216, e.g., the Avi™ Kubernetes™ Operator (AKO), is used to configure virtual service on a controller 206, e.g., the Avi™ controller, to detect and enable multi networks of pods in the container orchestration platform 220.

As shown in FIG. 2, a client 204, e.g., a tenant VPN client, sends domain name server (DNS) request to a DNS 202, and resolves virtual service hostname to the corresponding virtual service, e.g., the virtual service 210. The client 204 then sends the traffic to the corresponding virtual service. On receiving traffic from the client 204, the corresponding virtual service sends the traffic to one of the application pods that have secondary/multi NIC, e.g., the application pods 232. The application pod (backend application) receives the traffic on the secondary/multi MC and responds back to the corresponding virtual service. The virtual service in turn responds to the client 204.

The operator 226 works with the controller 206 to perform functions in the container orchestration platform 220. In some implementations, the operator 226 runs as a pod in the container orchestration platform 220 and automates the implementation of ingresses/routes/services on the service engines 208 and 210 via the controller 206. In some implementations, the controller 206 manages the lifecycle of the service engines 208 and 210, their configurations, and provides centralized analytics and observability. In some implementations, node 216 is a worker node which hosts pods that are the components of the application workload of the container orchestration platform 220.

Figure 3:
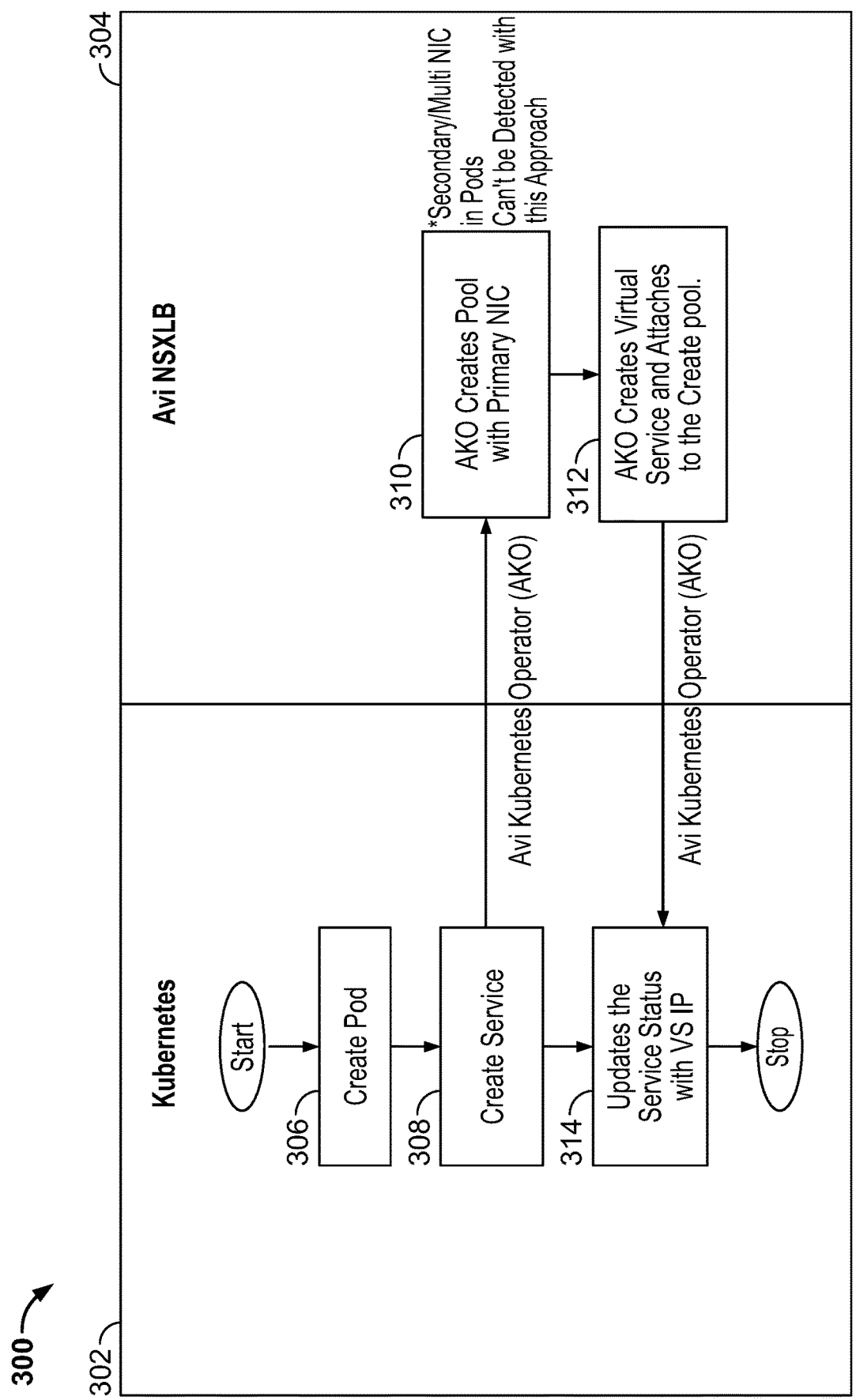
FIG. 3 illustrates an example flow for default/primary network interface, in accordance with example implementations of this specification.

FIG. 3 illustrates an example 300 of an implementation in a container orchestration platform 302, where a virtual service is created in a load balancer and corresponds to a service object in the container orchestration platform 302. In this example, a default/primary NIC in a pod is exposed by a service object in the container orchestration platform 302 as the service endpoint. A secondary/multi NIC in the pod cannot be detected. In some implementations, a service endpoint is an object that gets the IP addresses of individual pods assigned to it.

As illustrated in FIG. 3, at 306, a pod is created in the container orchestration platform 302, as shown in the example code below, where two instances of applications are included in the pod. In some implementations, a pod is an abstraction in the container orchestration platform 302 that represents a group of one or more application containers and some shared resources for those containers.

```
apiVersion: apps/v1
kind: Deployment
metadata:
    name: nginx-deployment
    labels:
        app: MyApp
spec:
    replicas: 2
    selector:
        matchLabels:
            app: MyApp
    template:
        metadata:
            labels:
                app: MyApp
        spec:
            containers:
            - name: nginx
              image: 10.79.204.3:5001/nginx_echo_sleep:latest
              ports:
              - containerPort: 8080
```

At 308, a service object in the container orchestration platform 302 is created with a type for a load balancer, in order to expose the pod created at 306, as shown in the example code below. In some implementations, the service object created at 308 exposes an application running on the pod created at 306 as a network service to the external world, and the service object will load balance requests with matching label selector, e.g., app:MyApp as shown in the code below.

```
apiVersion: v1
kind: Service metadata:
   name: my-service
spec
   selector:
      app: MyApp
   ports:
      protocol: TCP
         port: 80
         targerPort: 8080
   type: LoadBalancer
```

In some implementations, an endpoint object is then in turn referenced by a service in the container orchestration platform 302 so that the service has a record of the internal IP addresses of the pod created at 306, in order for the service to communicate with the pod, as shown in the example code below.

```
kubectl get ep my-service
NAME         ENDPOINTS                              AGE
my-service   10.130.3.220:80,10.130.3.221:80        11 m
```

At 310, an operator in the container orchestration platform 302, e.g., the AKO in this example 300, creates, in a load balancer 304, a pool with a default/primary NIC. In some implementations, a pool includes a list of backend servers assigned to virtual service and performs health monitoring, load balancing, persistence, and functions that involve virtual service to backend server interaction. Because the pool is created with a default/primary NIC, if the pod created at 306 also includes secondary/multi NIC, the secondary/multi NIC cannot be detected, and only the default/primary NIC is exposed.

At 312, the operator in the container orchestration platform 302 creates, in the load balancer 304, a virtual service object for the corresponding service object created at 308, e.g., my-service, and attaches the created virtual service object to the pool created at 310, e.g., with 10.130.3.220 & 10.130.3.221 shown in the example code at 308 as members of the pool created at 310.

At 314, the container orchestration platform 302 updates the status of the service object created at 308 with the IP details of the virtual service object created at 314.

Figure 4:
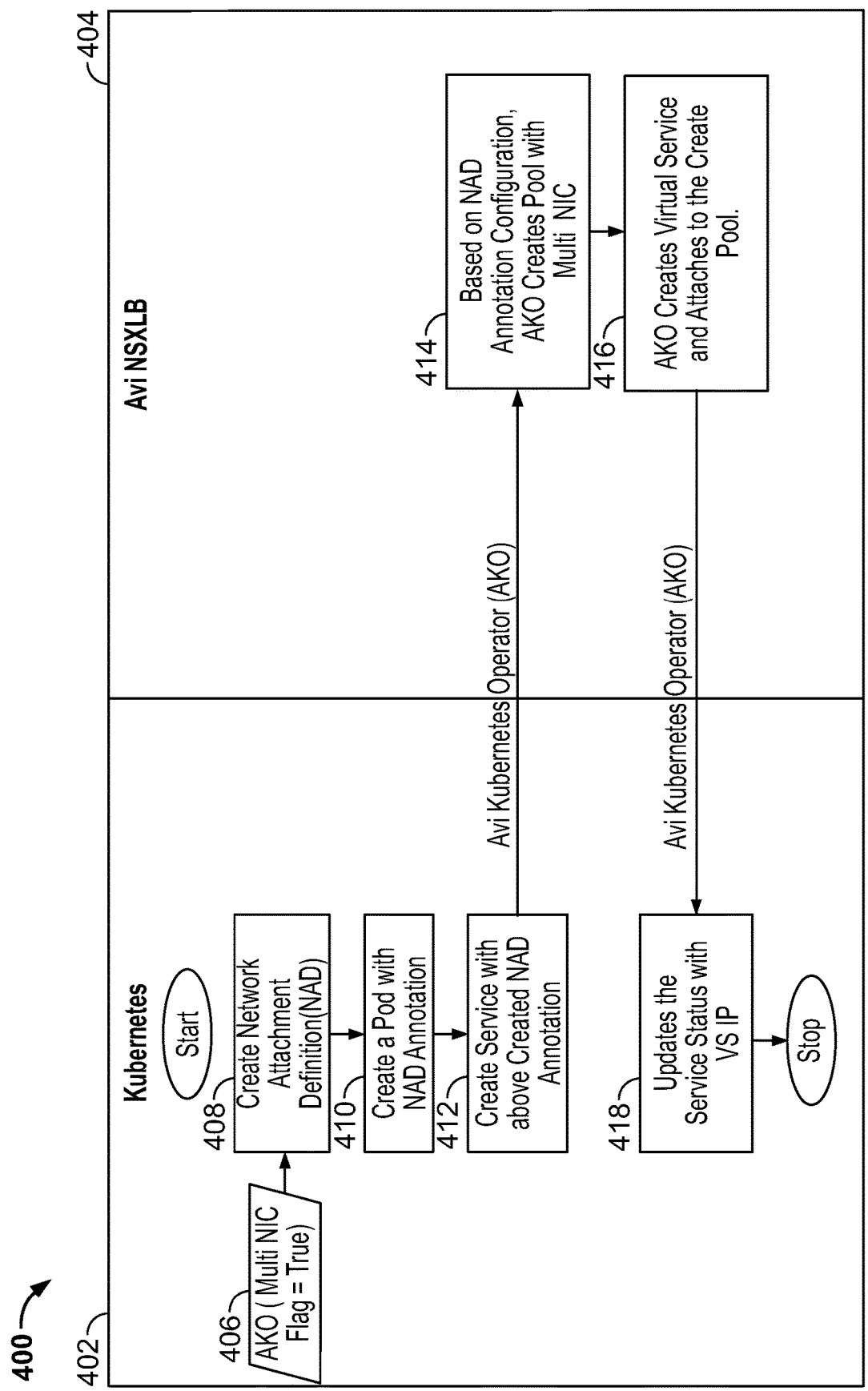
FIG. 4 illustrates an example flow for multi-network/domain service discovery in a container orchestration platform, in accordance with example implementations of this specification.

FIG. 4 illustrates an example 400 of a flow in a container orchestration platform 402, in accordance with example implementations of this specification. Unlike example 300 illustrated in FIG. 3, here in example 400, a secondary/multi NIC in a pod is exposed by a service object in the container orchestration platform 402 as the service endpoint, as shown in the steps described below.

As illustrated in FIG. 4, at 406, in order to enable an operator in the container orchestration platform 402, e.g., the AKO, to support multi network interface, a multi-NIC flag in AKO configuration file is set to true, as shown in the last line of the example code below.

```
AKOSettings:
   logLevel: "INFO"
   fullSyncFrequency: "1800"
   apiServerPort: 8080
   deleteConfig: "false"
   disableStaticRouteSync: "false"
   clusterName: "my-cluster"
   cniPlugin: " "
   GRBAC: false
   layer7Only: false
   namespaceSelector:
      labelKey: " "
      label Value: " "
   servicesAPI: false
   multiNetwork: "true"
```

At 408, a Network Attachment Definition (NAD) object, which is a Custom Resources Definition (CRD) object used to express the intent for attaching pods to one or more logical or physical networks, is created to define secondary/multi NIC, as shown in the example code below. Multiple instances of the NAD object can be created based on the number of Network/NIC requirements.

```
apiVersion: "k8s.cni.cncfio/v1"
kind: NetworkAttachmentDefinition
metadata:
   name: secondaryNic
spec:
   config: '{
      "cniVersion": "0.3.0",
      "type": "macvlan",
      "master": "eth0",
      "mode": "bridge",
      "ipam": {
         "type": "host-local",
         "subnet": "192.168.12.0/24",
         "rangeStart": "192.168.12.20",
         "rangeEnd": "192.168.12.100",
         "routes": [
            {"dst": "0.0.0.0/0"}
         ],
         "gateway": "192.168.12.1"
      }
   }
```

At 410, a pod is created with an annotation corresponding to the NAD object created at 408, as shown in the example code below, where the annotation is "k8s.v1.cni.cncf.io/networks: secondaryNic" in the example. This will attach a secondary network interface to the pod, in addition to the default/primary NIC described in FIG. 3. In some implementations, an annotation is an arbitrary non-identifying metadata that can be attached to an object in the container orchestration platform 402.

```
apiVersion: v1
kind: Pod
metadata:
   annotations:
      k8s.v1.cni.cncf.io/networks: secondaryNic
```

At 412, a service object is created with the annotation created at 410, as shown in the example code below.

```
apiVersion: v1
kind: Service
metadata:
   annotations:
      k8s.v1.cni.cncf.io/networks: secondaryNic
```

At 414, an operator in the container orchestration platform 402, e.g., the AKO in this example 400, creates, in a load balancer 404, a pool of servers based on the secondary/multi NIC annotated in the annotation used to create the pod at 410, as shown in the example code below. The IP details mentioned in "k8s.v1.cni.cncf.io/networks-status" in the example code below can be referred to by the load balancer 404 when service/ingress with "k8s.v1.cni.cncf.io/networks", e.g., with "k8s.v1.cni.cncf.io/networks: secondaryNic", is created by the load balancer 404.

```
Annotations:
   k8s.v1.cni.cncf.io/networks: secondaryNic
   k8s.v1.cni.cncf.io/networks-status:
      [{
```

```
"name": "cbr0",
"ips": [
    "10.244.1.73"
],
"default": true,
"dns": { }
}, {
"name": "secondaryNic",
"interface": "net1",
"ips": [
    "192.168.12.29"
],
"mac": "86:1d:96:ff:55:0d",
"dns": { }
}]
```

Figure 5:
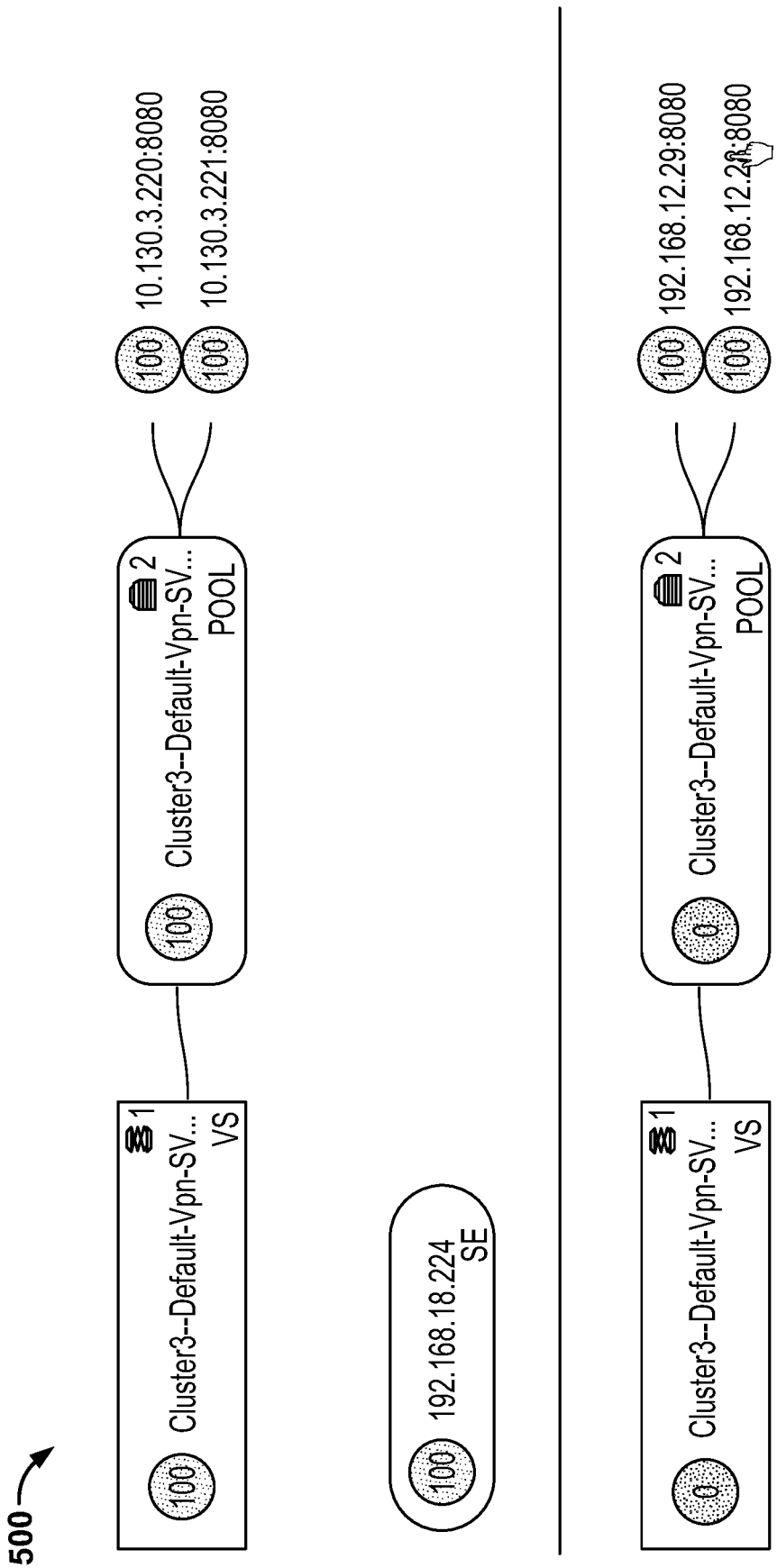
FIG. 5 illustrates an example virtual service pool-servers with secondary/multi network interface details of a pod, in accordance with example implementations of this specification.

At 416, the operator in the container orchestration platform 402, e.g., the AKO in example 400, creates a virtual service for the corresponding service object created at 412. The created virtual service is then attached to the pool created at 414, using the secondary/multi NIC details of the pod created at 410, as shown in the example illustrated in FIG. 5. Note that the pool servers having IP networks 192.168.12.x in FIG. 5 represent secondary/multi NIC components of the pods, and the pool servers having IP networks 10.130.3.X in FIG. 5 represent default NIC components of the pods. In general, the load balancer 404 uses the created virtual service to receive traffic from a client, and the received traffic in turn will be sent to pool server having secondary/multi NIC that was discovered using the operator in the container orchestration platform 402, e.g., the AKO in example 400.

At 418, the container orchestration platform 402 updates the status of the service object created at 412 with the IP details of the virtual service object created at 416.

Figure 6:
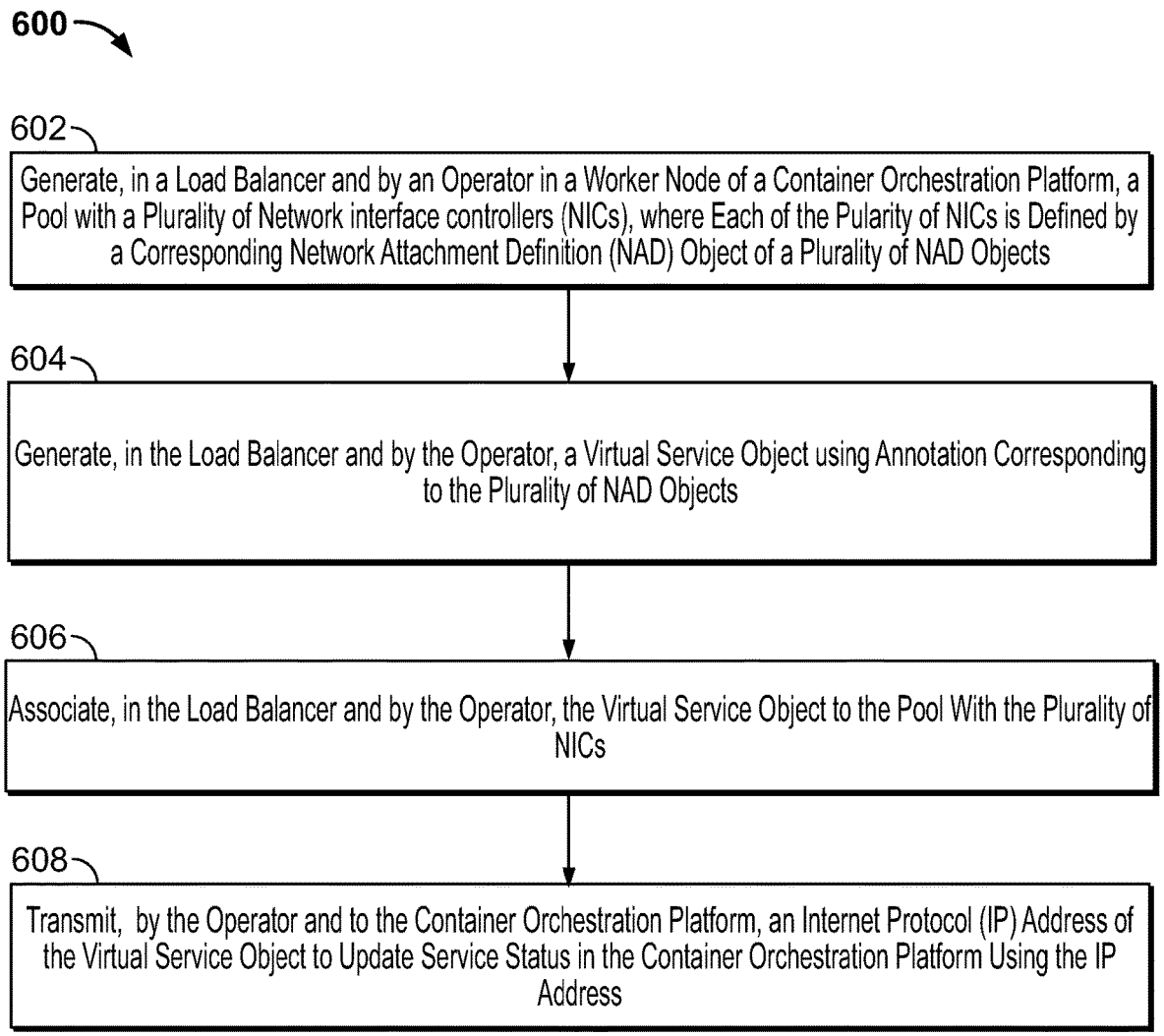
FIG. 6 is a flowchart illustrating an example of a method for multi-network/domain service discovery in a container orchestration platform, in accordance with example implementations of this specification.

FIG. 6 illustrates an example multi-network/domain service discovery case in a container orchestration platform, in accordance with example implementations of this specification.

At 602, a computer system generates, in a load balancer and using an operator in a worker node of a container orchestration platform, a pool with a plurality of NICs, where each of the plurality of NICs is defined by a corresponding NAD object of a plurality of NAD objects.

At 604, the computer system generates, in the load balancer and using the operator, a virtual service object using annotation corresponding to the plurality of NAD objects.

At 606, the computer system associates, in the load balancer and using the operator, the virtual service object to the pool with the plurality of NICs.

At 608, the computer system transmits, using the operator and to the container orchestration platform, an internet protocol (IP) address of the virtual service object to update service status in the container orchestration platform using the IP address.

Figure 7:
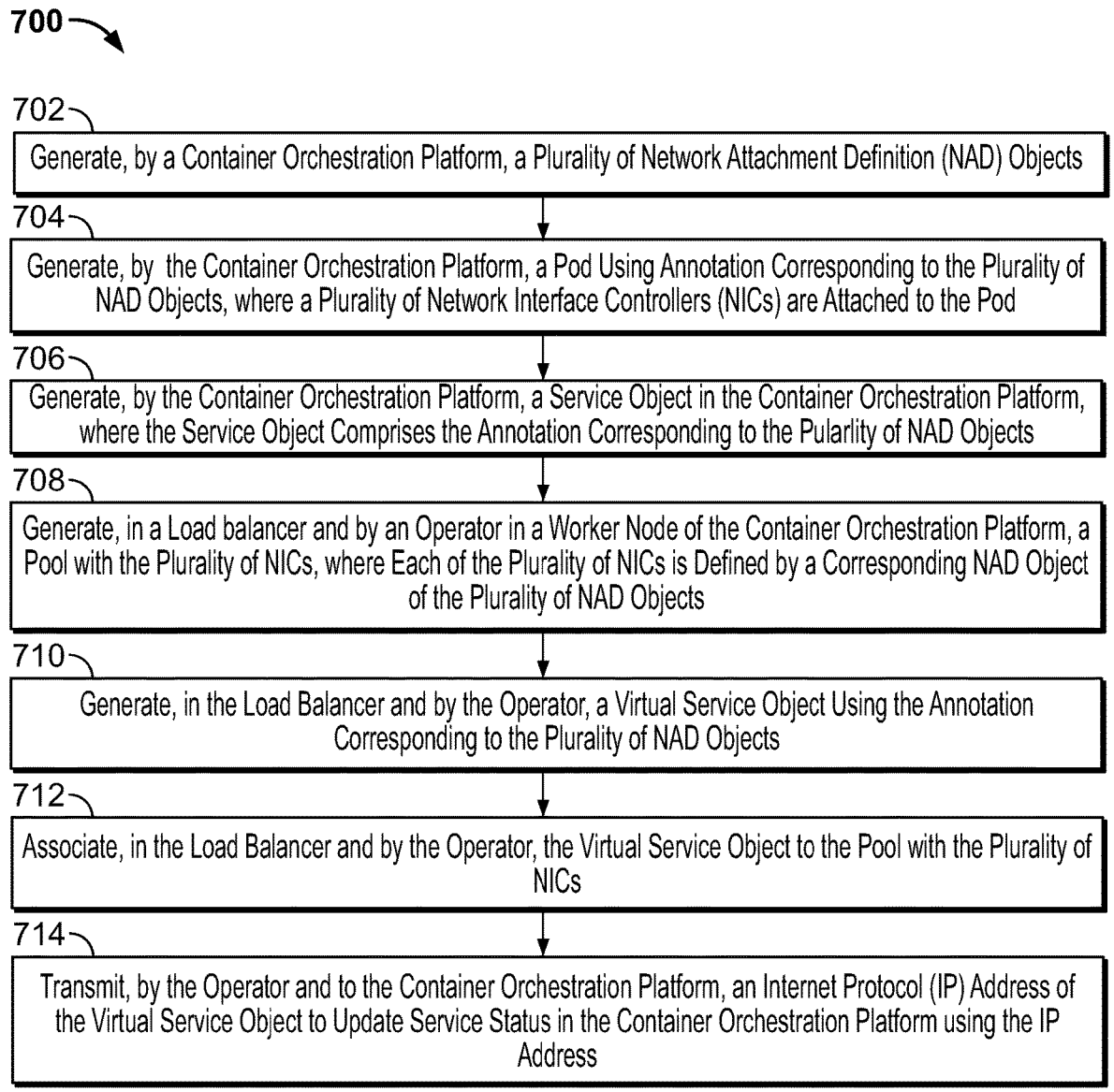
FIG. 7 is a flowchart illustrating an example of a method for multi-network/domain service discovery in a container orchestration platform, in accordance with example implementations of this specification.

FIG. 7 illustrates an example multi-network/domain service discovery case in a container orchestration platform, in accordance with example implementations of this specification.

At 702, a computer system generates, in a container orchestration platform, a plurality of NAD objects.

At 704, the computer system generates, in the container orchestration platform, a pod using annotation corresponding to a plurality of NAD objects, wherein a plurality of network interface controllers (NICs) are attached to the pod.

At 706, the computer system generates, in the container orchestration platform, a service object in the container orchestration platform, where the service object comprises the annotation corresponding to the plurality of NAD objects.

At 708, the computer system generates, in a load balancer and using an operator in a worker node of a container orchestration platform, a pool with a plurality of NICs, where each of the plurality of NICs is defined by a corresponding NAD object of a plurality of NAD objects.

At 710, the computer system generates, in the load balancer and using the operator, a virtual service object using annotation corresponding to the plurality of NAD objects.

At 712, the computer system associates, in the load balancer and using the operator, the virtual service object to the pool with the plurality of NICs.

At 714, the computer system transmits, using the operator and to the container orchestration platform, an internet protocol (IP) address of the virtual service object to update service status in the container orchestration platform using the IP address.

Figure 8:
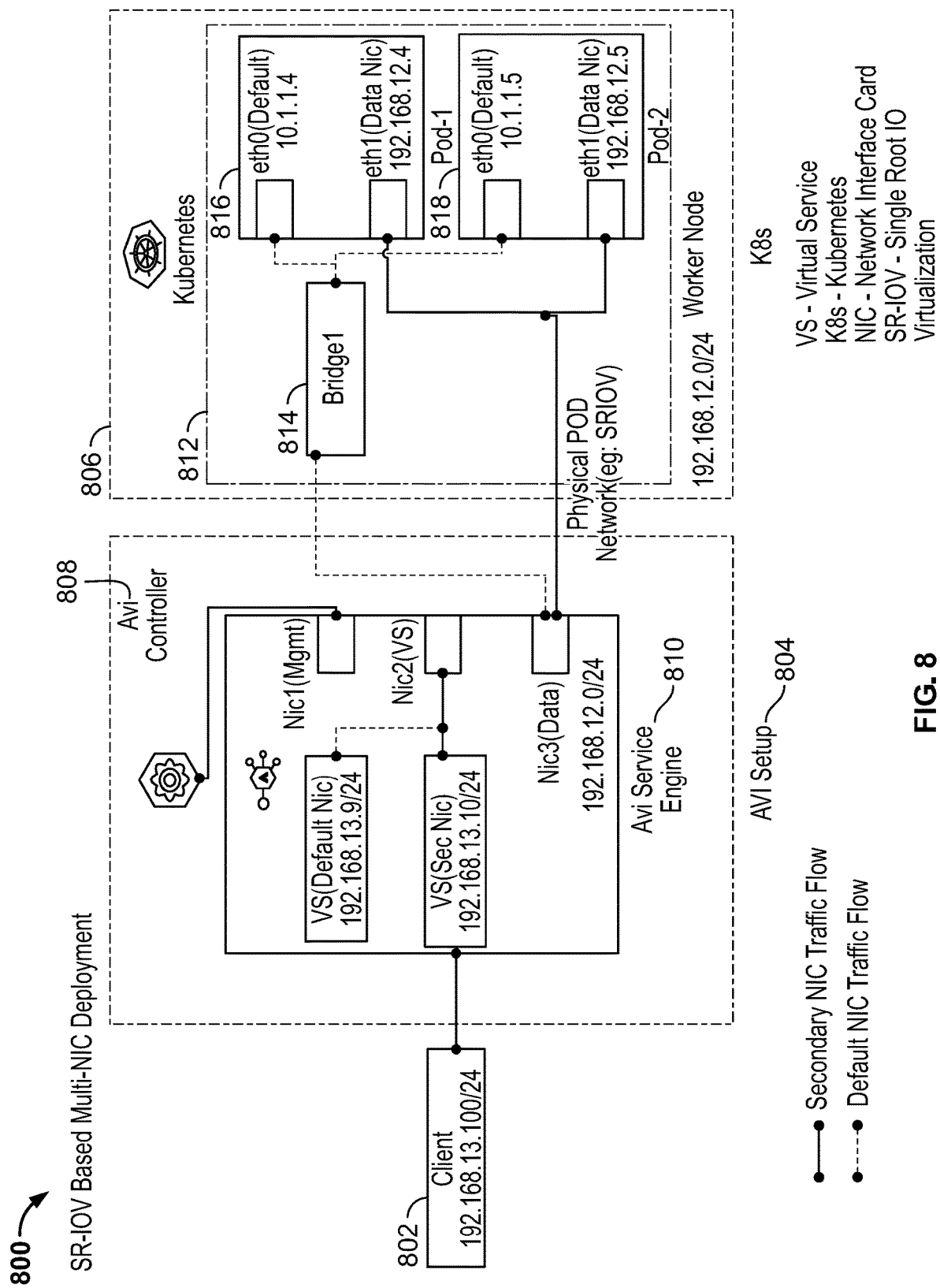
FIG. 8 illustrates an example use case of multi-network/domain service discovery in a container orchestration platform, in accordance with example implementations of this specification.

FIG. 8 illustrates a Single root input/output virtualization (SR-IOV) based multi-NIC deployment for high throughput & latency sensitive use cases of 5G world, where the physical NIC connection in solid lines between the Avi™ service engine 810 and the backend pods 816 and 818 in the worker node 812 is via SR-IOV which can improve both traffic throughput and latency. The data Nics in pods 816 and 818 correspond to the secondary/multi NIC generated using the flow illustrated in FIG. 4. In contrast, the physical NIC connection in dotted lines between the Avi™ service engine 810 and the backend pods 816 and 818 in the worker node 812 uses the default/primary NIC deployment and is less effective in supporting high throughput & latency sensitive use cases. The default NICs in pods 816 and 818 correspond to the default/primary NIC generated using the flow illustrated in FIG. 3.

Figure 9:
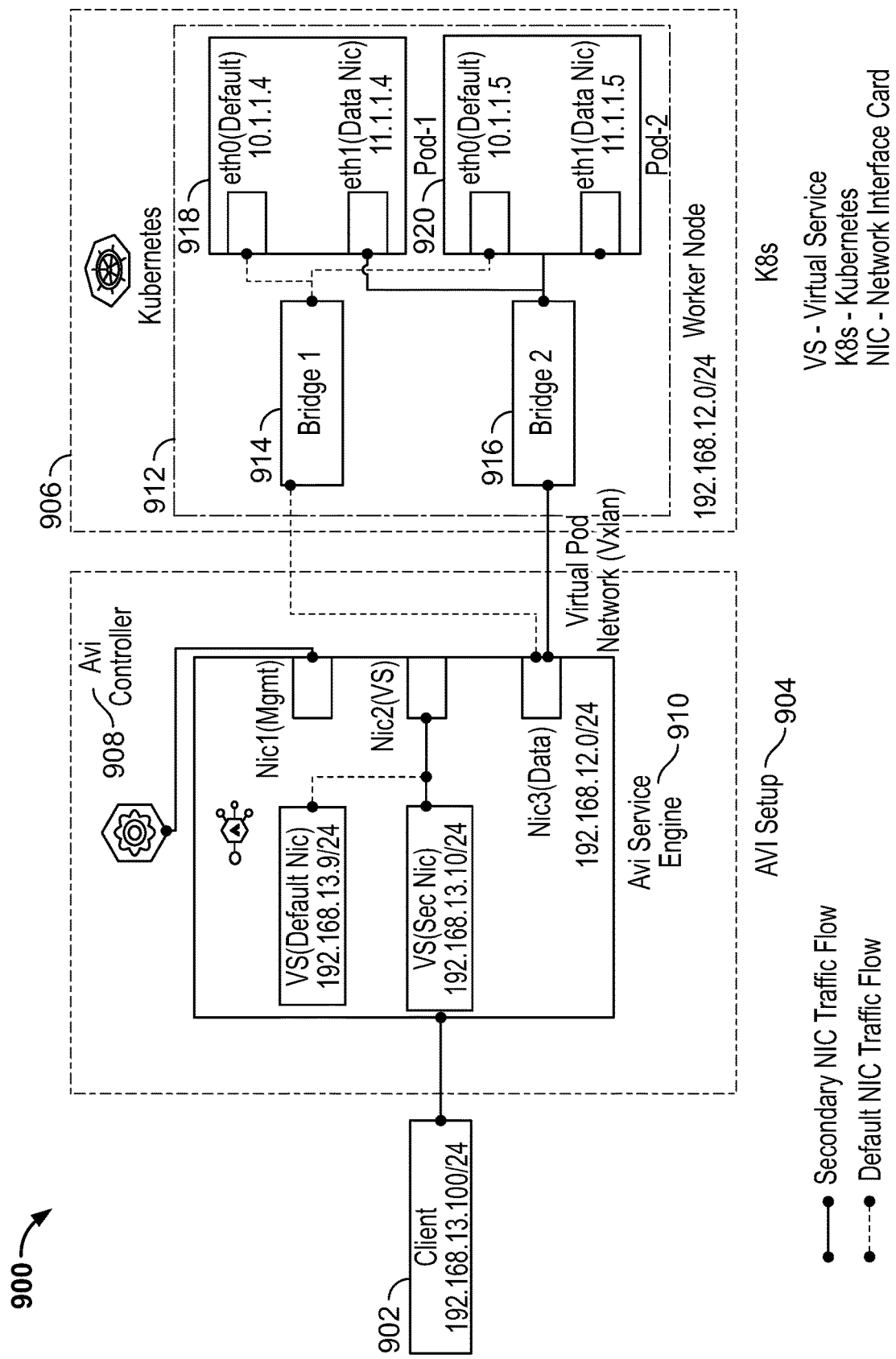
FIG. 9 illustrates an example use case of multi-network/domain service discovery in a container orchestration platform, in accordance with example implementations of this specification.

FIG. 9 illustrates a virtual (VXLAN/Bridge) based multi-NIC deployment with dedicated data plane & control plane for Enterprise use cases, where the virtual NIC connection in solid lines between the Avi™ service engine 910 and the backend pods 918 and 920 in the worker node 912 is via VXLAN. Note that static route needs to be configured in the load balancer for the traffic to reach pods' secondary NICs. The data Nics in pods 918 and 920 correspond to the secondary/multi NIC generated using the flow illustrated in FIG. 4. In contrast, the virtual NIC connection in dotted lines between the Avi™ service engine 910 and the backend pods 918 and 920 in the worker node 912 uses the default/primary NIC deployment and is less effective in supporting these use cases. The default NICs in pods 918 and 920 correspond to the default/primary NIC generated using the flow illustrated in FIG. 3.

Figure 10:
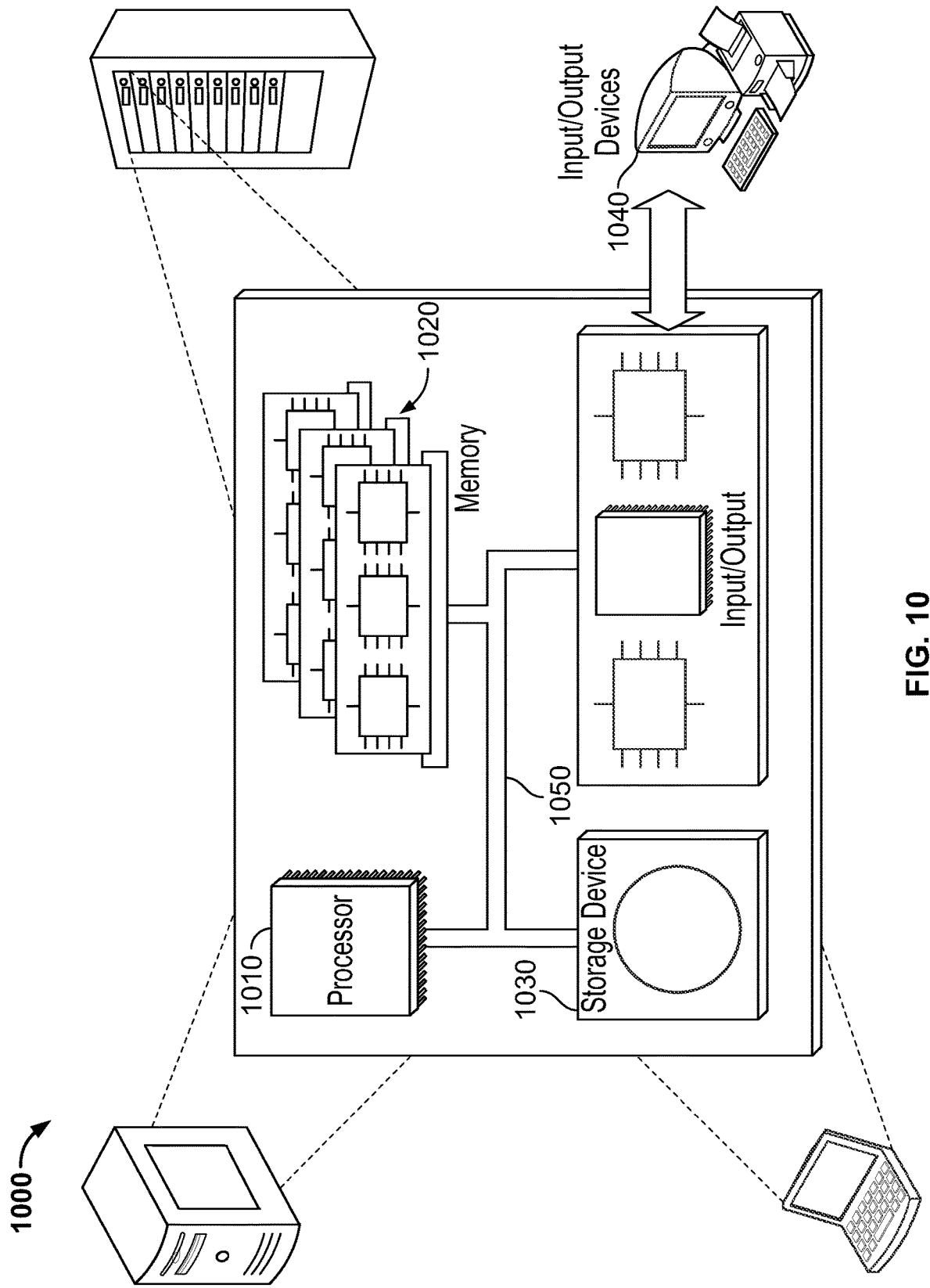
FIG. 10 is a schematic illustration of example computer systems that can be used to execute implementations of the present disclosure.

FIG. 10 illustrates a schematic diagram of an example computing system 1000. The system 1000 can be used for the operations described in association with the implementations described herein. For example, the system 1000 may be included in any or all of the server components discussed herein. The system 1000 includes a processor 1010, a memory 1020, a storage device 1030, and an input/output device 1040. The components 1010, 1029, 1030, and 1040 are interconnected using a system bus 1050. The processor 1010 is capable of processing instructions for execution within the system 1000. In some implementations, the processor 1010 is a single-threaded processor. In some implementations, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. In some implementations, the memory 1120 is a volatile memory unit. In some implementations, the memory 1020 is a non-volatile memory unit. The storage device 1030 is capable of providing mass storage for the system 1000. In some implementations, the storage device 1030 is a computer-readable medium. In some implementations, the storage device 1030 may be a floppy disk device, a hard disk device, an optical disk device, or a tape device. The input/output device 1040 provides input/output operations for the system 1000. In some implementations, the input/output device 1040 includes a keyboard and/or pointing device. In some implementations, the input/output device 1040 includes a display unit for displaying graphical user interfaces.

Certain aspects of the subject matter described here can be implemented as a method. A pool of servers with multiple network interface controllers (NICs) is created in a load balancer and by an operator in a worker node of a container orchestration platform. Each of the multiple NICs is defined by a corresponding network attachment definition (NAD) object of multiple NAD objects. A virtual service object is generated using annotation corresponding to the multiple NAD objects. The virtual service object is associated to the pool of servers with the multiple NICs. An internet protocol (IP) address of the virtual service object is transmitted to the container orchestration platform to update status of a service object in the container orchestration platform using the IP address.

An aspect taken alone or combinable with any other aspect includes the following features. Before the pool of servers with the multiple NICs is created, a pod is generated by the container orchestration platform using the annotation corresponding to the multiple NAD objects. The multiple NICs are attached to the pod. The service object is generated in the container orchestration platform. The service object includes the annotation corresponding to the multiple NAD objects.

An aspect taken alone or combinable with any other aspect includes the following features. Before the pod is generated by the container orchestration platform using the annotation corresponding to the multiple NAD objects, the multiple NAD objects is generated by the container orchestration platform.

An aspect taken alone or combinable with any other aspect includes the following features. After the service object is generated in the container orchestration platform, and before the pool of servers with the multiple NICs is created in the load balancer and by the operator in the worker node of the container orchestration platform, annotation in the service object in the container orchestration platform is determined. The multiple NICs in the pod is determined based on the determined annotation in the service object.

An aspect taken alone or combinable with any other aspect includes the following features. The pod is an object in the container orchestration platform. The pod includes multiple application containers and multiple resources shared among the multiple application containers.

An aspect taken alone or combinable with any other aspect includes the following features. The pool of servers includes a list of multiple backend servers assigned to multiple virtual services. The pool of servers performs at least one of health monitoring, load balancing, persistence, or interaction between the multiple backend servers and the multiple virtual services.

An aspect taken alone or combinable with any other aspect includes the following features. Each of the multiple NAD objects includes a respective custom resource definition (CRD) schema associated with attaching a respective NIC to a respective pod.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for multi-network/domain service discovery in a container orchestration platform, comprising:
   creating, in a load balancer and by an operator in a worker node of a container orchestration platform, a pool of servers with a plurality of network interface controllers (NICs), wherein each of the plurality of NICs is defined by a corresponding network attachment definition (NAD) object of a plurality of NAD objects;
   generating, in the load balancer and by the operator, a virtual service object using an annotation corresponding to the plurality of NAD objects;
   associating, in the load balancer and by the operator, the virtual service object to the pool of servers with the plurality of NICs; and
   transmitting, by the operator and to the container orchestration platform, an internet protocol (IP) address of the virtual service object to update a status of a service object in the container orchestration platform using the IP address.

2. The computer-implemented method according to claim 1, wherein before creating the pool of servers with the plurality of NICs, the method further comprises:
   generating, by the container orchestration platform, a pod using the annotation corresponding to the plurality of NAD objects, wherein the plurality of NICs are attached to the pod; and
   generating, by the container orchestration platform, the service object in the container orchestration platform, wherein the service object comprises the annotation corresponding to the plurality of NAD objects.

3. The computer-implemented method according to claim 2, wherein the method further comprises:
   before generating, by the container orchestration platform, the pod using the annotation corresponding to the plurality of NAD objects, generating, by the container orchestration platform, the plurality of NAD objects.

4. The computer-implemented method according to claim 2, wherein after generating, by the container orchestration platform, the service object in the container orchestration platform, and before creating, in the load balancer and by the operator, the pool of servers with the plurality of NICs, the method further comprises:
   determining, in the load balancer and by the operator, an annotation in the service object in the container orchestration platform; and
   determining, in the load balancer and by the operator, the plurality of NICs in the pod based on the determined annotation in the service object.

5. The computer-implemented method according to claim 2, wherein the pod is an object in the container orchestration platform, and wherein the pod comprises a plurality of application containers and a plurality of resources shared among the plurality of application containers.

6. The computer-implemented method according to claim 1, wherein the pool of servers comprises a list of a plurality of backend servers assigned to a plurality of virtual services, and wherein the pool of servers performs at least one of health monitoring, load balancing, persistence, or interaction between the plurality of backend servers and the plurality of virtual services.

7. The computer-implemented method according to claim 1, wherein each of the plurality of NAD objects comprises a respective custom resource definition (CRD) schema associated with attaching a respective NIC to a respective pod.

8. A non-transitory, computer-readable medium storing one or more instructions executable by a computer system to perform operations, the operations comprising:
   creating, in a load balancer and by an operator in a worker node of a container orchestration platform, a pool of servers with a plurality of network interface controllers (NICs), wherein each of the plurality of NICs is defined by a corresponding network attachment definition (NAD) object of a plurality of NAD objects;
   generating, in the load balancer and by the operator, a virtual service object using an annotation corresponding to the plurality of NAD objects;

associating, in the load balancer and by the operator, the virtual service object to the pool of servers with the plurality of NICs; and transmitting, by the operator and to the container orchestration platform, an internet protocol (IP) address of the virtual service object to update a status of a service object in the container orchestration platform using the IP address.

9. The non-transitory, computer-readable medium according to claim 8, wherein before creating the pool of servers with the plurality of NICs, the operations further comprise:

generating, by the container orchestration platform, a pod using the annotation corresponding to the plurality of NAD objects, wherein the plurality of NICs are attached to the pod; and generating, by the container orchestration platform, the service object in the container orchestration platform, wherein the service object comprises the annotation corresponding to the plurality of NAD objects.

10. The non-transitory, computer-readable medium according to claim 9, wherein the operations further comprise:

before generating, by the container orchestration platform, the pod using the annotation corresponding to the plurality of NAD objects, generating, by the container orchestration platform, the plurality of NAD objects.

11. The non-transitory, computer-readable medium according to claim 9, wherein after generating, by the container orchestration platform, the service object in the container orchestration platform, and before creating, in the load balancer and by the operator, the pool of servers with the plurality of NICs, the operations further comprise:

determining, in the load balancer and by the operator, an annotation in the service object in the container orchestration platform; and determining, in the load balancer and by the operator, the plurality of NICs in the pod based on the determined annotation in the service object.

12. The non-transitory, computer-readable medium according to claim 9, wherein the pod is an object in the container orchestration platform, and wherein the pod comprises a plurality of application containers and a plurality of resources shared among the plurality of application containers.

13. The non-transitory, computer-readable medium according to claim 8, wherein the pool of servers comprises a list of a plurality of backend servers assigned to a plurality of virtual services, and wherein the pool of servers performs at least one of health monitoring, load balancing, persistence, or interaction between the plurality of backend servers and the plurality of virtual services.

14. The non-transitory, computer-readable medium according to claim 8, wherein each of the plurality of NAD objects comprises a respective custom resource definition (CRD) schema associated with attaching a respective NIC to a respective pod.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations, the one or more operations comprising:

creating, in a load balancer and by an operator in a worker node of a container orchestration platform, a pool of servers with a plurality of network interface controllers (NICs), wherein each of the plurality of NICs is defined by a corresponding network attachment definition (NAD) object of a plurality of NAD objects;

generating, in the load balancer and by the operator, a virtual service object using an annotation corresponding to the plurality of NAD objects;

associating, in the load balancer and by the operator, the virtual service object to the pool of servers with the plurality of NICs; and transmitting, by the operator and to the container orchestration platform, an internet protocol (IP) address of the virtual service object to update a status of a service object in the container orchestration platform using the IP address.

16. The computer-implemented system according to claim 15, wherein before creating the pool of servers with the plurality of NICs, the one or more operations further comprise:

generating, by the container orchestration platform, a pod using the annotation corresponding to the plurality of NAD objects, wherein the plurality of NICs are attached to the pod; and generating, by the container orchestration platform, the service object in the container orchestration platform, wherein the service object comprises the annotation corresponding to the plurality of NAD objects.

17. The computer-implemented system according to claim 16, wherein the one or more operations further comprise:

before generating, by the container orchestration platform, the pod using the annotation corresponding to the plurality of NAD objects, generating, by the container orchestration platform, the plurality of NAD objects.

18. The computer-implemented system according to claim 16, wherein after generating, by the container orchestration platform, the service object in the container orchestration platform, and before creating, in the load balancer and by the operator, the pool of servers with the plurality of NICs, the one or more operations further comprise:

determining, in the load balancer and by the operator, an annotation in the service object in the container orchestration platform; and determining, in the load balancer and by the operator, the plurality of NICs in the pod based on the determined annotation in the service object.

19. The computer-implemented system according to claim 16, wherein the pod is an object in the container orchestration platform, and wherein the pod comprises a plurality of application containers and a plurality of resources shared among the plurality of application containers.

20. The computer-implemented system according to claim 15, wherein the pool of servers comprises a list of a plurality of backend servers assigned to a plurality of virtual services, and wherein the pool of servers performs at least one of health monitoring, load balancing, persistence, or interaction between the plurality of backend servers and the plurality of virtual services.

* * * * *